(12) United States Patent
Zelina et al.

(10) Patent No.: US 6,286,300 B1
(45) Date of Patent: Sep. 11, 2001

(54) COMBUSTOR WITH FUEL PREPARATION CHAMBERS

(75) Inventors: Joseph Zelina, Fountain Hill, AZ (US); Geoffrey D. Myers, Simpsonville, SC (US); Ram Srinivasan, Chandler; Robert S. Reynolds, Tempe, both of AZ (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/492,678

(22) Filed: Jan. 27, 2000

(51) Int. Cl.⁷ .................................................. F23R 3/30
(52) U.S. Cl. ................................. 60/39.36; 60/737
(58) Field of Search ............................ 60/39.36, 737, 60/748

(56) References Cited

U.S. PATENT DOCUMENTS

| | | |
|---|---|---|
| 2,729,062 * | 1/1956 | Hennig ................................. 60/737 |
| 3,589,127 | 6/1971 | Kenworthy . |
| 3,886,728 | 6/1975 | Quinn . |
| 3,905,192 | 9/1975 | Pierce et al. . |
| 4,054,028 | 10/1977 | Kawaguchi . |
| 4,187,674 | 2/1980 | Richardson . |
| 4,373,342 | 2/1983 | Willis et al. . |
| 5,251,447 | 10/1993 | Joshi et al. . |
| 5,450,725 * | 9/1995 | Takahara et al. ................... 60/737 |
| 5,638,682 | 6/1997 | Joshi et al. . |

* cited by examiner

Primary Examiner—Louis J. Casaregola
(74) Attorney, Agent, or Firm—Robert Desmond, Esq.

(57) ABSTRACT

An annular combustor having fuel preparation chambers mounted in the dome of the combustor. The fuel preparation chamber comprises an annular wall extending axially from an inlet to an exit that defines a mixing chamber. Mounted to the inlet are an air swirler and a fuel atomizer. The air swirler provides swirled air to the mixing chamber while the atomizer provides a fuel spray. On the downstream side of the exit, the fuel preparation chamber has an inwardly extending conical wall that compresses the swirling mixture of fuel and air exiting the mixing chamber.

18 Claims, 3 Drawing Sheets

COMBUSTOR WITH FUEL PREPARATION CHAMBERS

GOVERNMENT RIGHTS

The invention described herein was made in the performance of work under NASA Contract No. NAS3-27752 and is subject to the provisions of Section 305 of the National Aeronautics and Space Act of 1958 (42 U.S.C. 2457).

TECHNICAL FIELD

This invention relates generally to combustors used in gas turbine engine and in particular to a fuel preparation chamber which uniformly mixes fuel and air so as to reduce NOx formed by the ignition of the fuel/air mixture.

BACKGROUND OF THE INVENTION

Air pollution concerns worldwide have led to stricter emissions standards requiring significant reductions in gas turbine pollutant emissions for both industrial and power generation applications and propulsion applications. Nitrous Oxide (NOx), which is a precursor to atmospheric pollution, is generally formed in the high temperature regions of the gas turbine combustor by direct oxidation of atmospheric nitrogen with oxygen. Reductions in gas turbine emissions of NOx have been obtained by the reduction of flame temperatures in the combustor by a variety of techniques including "rich burn, quick quench, lean burn" and "lean premix" combustion.

Many propulsion engines employ annular combustors to burn fuel. The fuel is metered and sprayed into the combustor through a plurality of fuel nozzles along with combustion air having a designated amount of swirl. The prior art, however, does not disclose a nozzle or the dome end of the combustor configured to mix the fuel and air uniformly to reduce the flame temperatures. Accordingly, non-uniformity of the air/fuel mixture causes the flame to be locally hotter; leading to significantly enhanced production of NOx.

In the typical aircraft gas turbine engine, flame stability and variable cycle operation of the engine dominate combustor design requirements. This has in general resulted in combustor designs with the combustion at the dome end of the combustor proceeding at the highest possible temperatures at stoichiometeric conditions, which in turn, leads to large quantities of NOx.

While premixing ducts in the prior art have been utilized in lean burning designs, they have been found to be unsatisfactory due to flashback and auto-ignition considerations for modern propulsion applications. Flashback involves the flame of the combustor being drawn back into the mixing section, which is most often caused by a backflow from the combustor due to compressor instability and transient flows. Auto-ignition of the fuel/air mixture can occur within the premixing duct if the velocity of the airflow is not fast enough, i.e., where there is a local region of high residence time. Flashback and auto-ignition have become serious considerations in the design of mixers for propulsion engines due to increased pressure ratios and operating temperatures.

Accordingly, there is a need for a fuel preparation chamber that provides a more uniform mixture of fuel and air in the combustor.

SUMMARY OF THE INVENTION

An object of the present invention is to provide for a low emissions combustor for use in gas turbine engines.

Another object of the present invention is to provide a method for forming a low emissions gas in a combust.

The present invention achieves this object by providing an annular combustor having fuel preparation chambers mounted in the dome of the combustor. The fuel preparation chamber comprises a cylindrical wall extending axially from an inlet to an exit that defines a mixing chamber. Mounted to the inlet are an air swirler and a fuel atomizer. The air swirler provides swirled air to the mixing chamber while the atomizer provides a fuel spray. On the downstream side of the exit, the fuel preparation chamber has an inwardly extending conical wall that compresses the swirling mixture of fuel and air exiting the mixing chamber.

A method for producing a low emission gas in a combustor is also disclosed. The method includes injecting a fuel spray into a plurality of circumferentially disposed premix chambers, each of which fluidly communicates with a single combustion chamber. Concurrently and concentrically with the fuel spray swirled air is flowed into each of the premix chambers to form a swirling mixture of fuel and air. The swirling mixture is than compressed before entering the combustion chamber. Upon entering the combustion chamber, the swirling mixture is expanded and ignited to form a low emissions gas.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
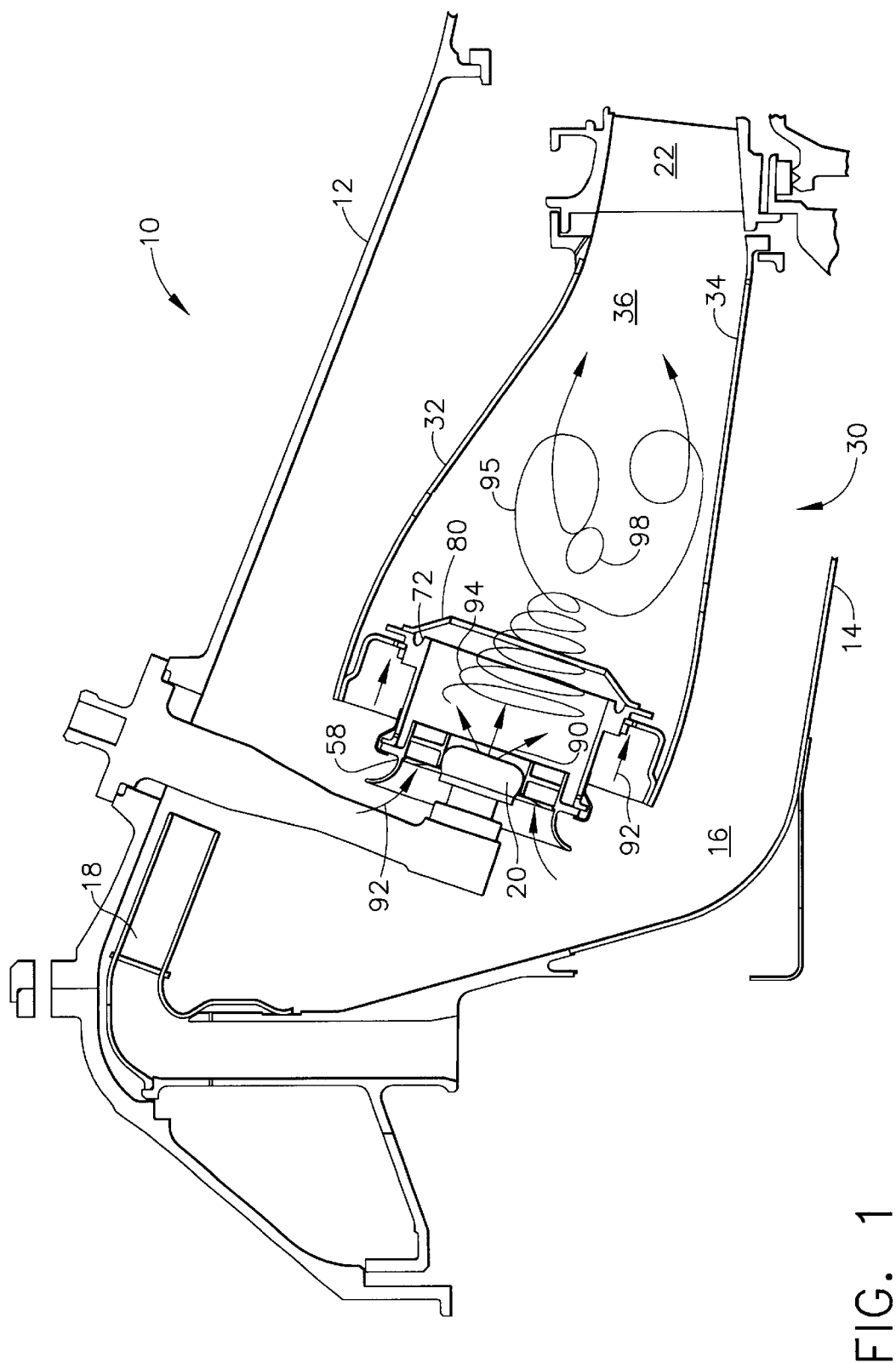
FIG. 1 is a cross-sectional view of a section of a gas turbine engine having an annular combustor with fuel preparation chambers as contemplated by the present invention.

Referring to the drawings, FIG. 1 shows a section of a gas turbine engine 10. The engine 10 has an outer casing 12 and inner casing 14 radially spaced apart to define an annular combustor chamber 16. Mounted within this chamber 16 is an annular combustor 30. In operation pressurized air exits the engine's compressor 18 and flows into the chamber 16. Air in the chamber 16 enters the combustor 30 through variety of holes that will be described later in the specification. Fuel is sprayed into the combustor 30 by fuel atomizers 20. The fuel and air in the combustor 30 is ignited to form a hot gas which flows from the combustor 30 to a turbine represented by a first turbine stage 22 where the gas is expanded and work extracted.

Figure 2:
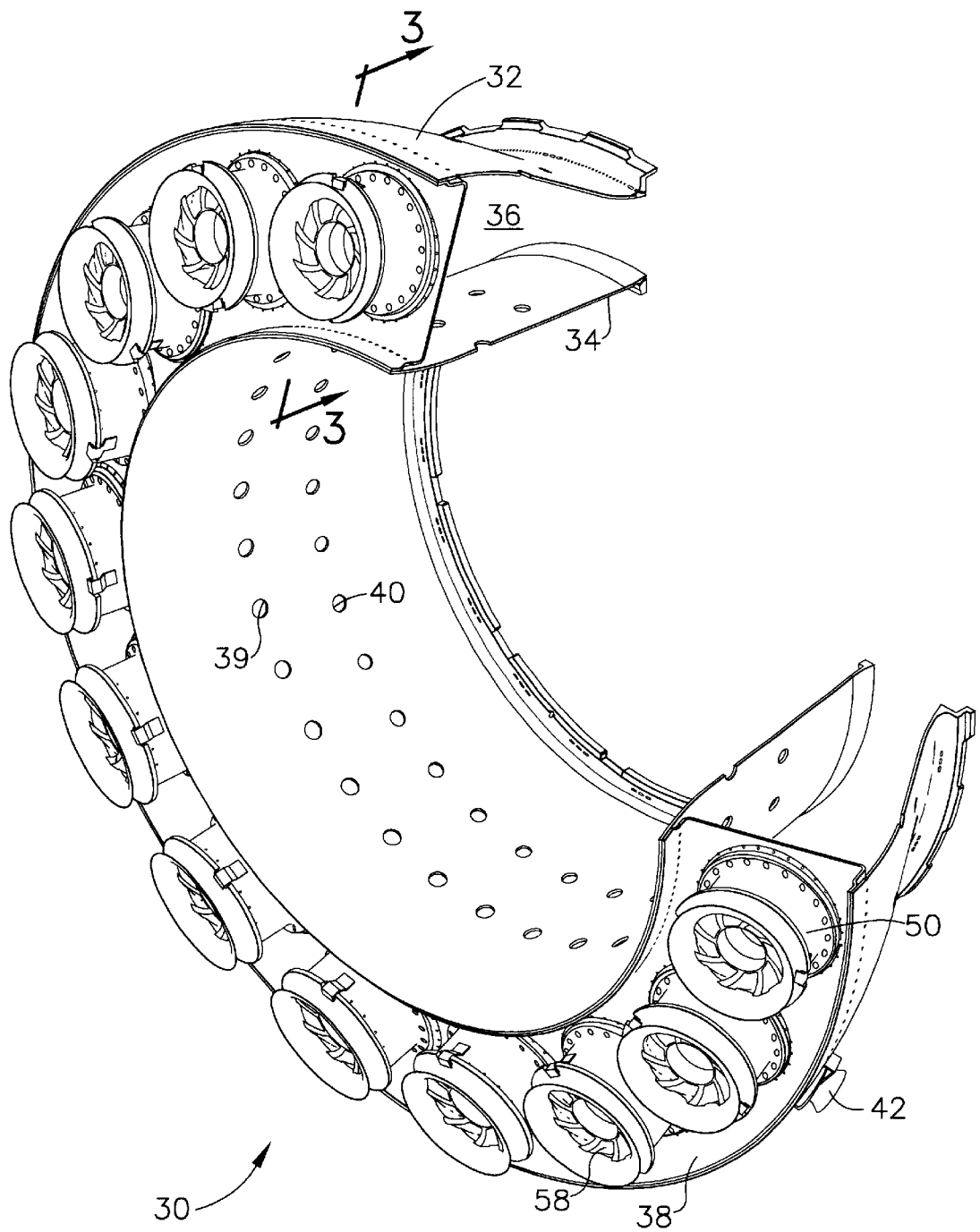
FIG. 2 is a perspective view of the annular combustor of FIG. 1.

Referring to FIG. 2, the combustor 30 is an annular through flow combustor having an outer liner or wall 32 and an inner liner or wall 34. The walls are radially spaced apart to define a combustion chamber 36 therebetween. At the upstream side of the combustor, a radially extending annular wall referred to as the dome 38 connects the two liners. The downstream side of the combustor is open to allow the hot gas to exit the chamber 36 and enter the turbine stage 22. The inner and outer liners 32,34 each have two sets of circumferentially spaced holes known to those skilled in the art as primary and secondary dilution holes 39 and 40. In addition these walls preferably have effusion holes to permit preferential cooling. The outer wall 32 has at least one boss 42 for receiving an igniter not shown. In the preferred embodiment, the dome 38 has a plurality of axial facing holes, each of which receives a fuel preparation chamber 50.

Figure 3:
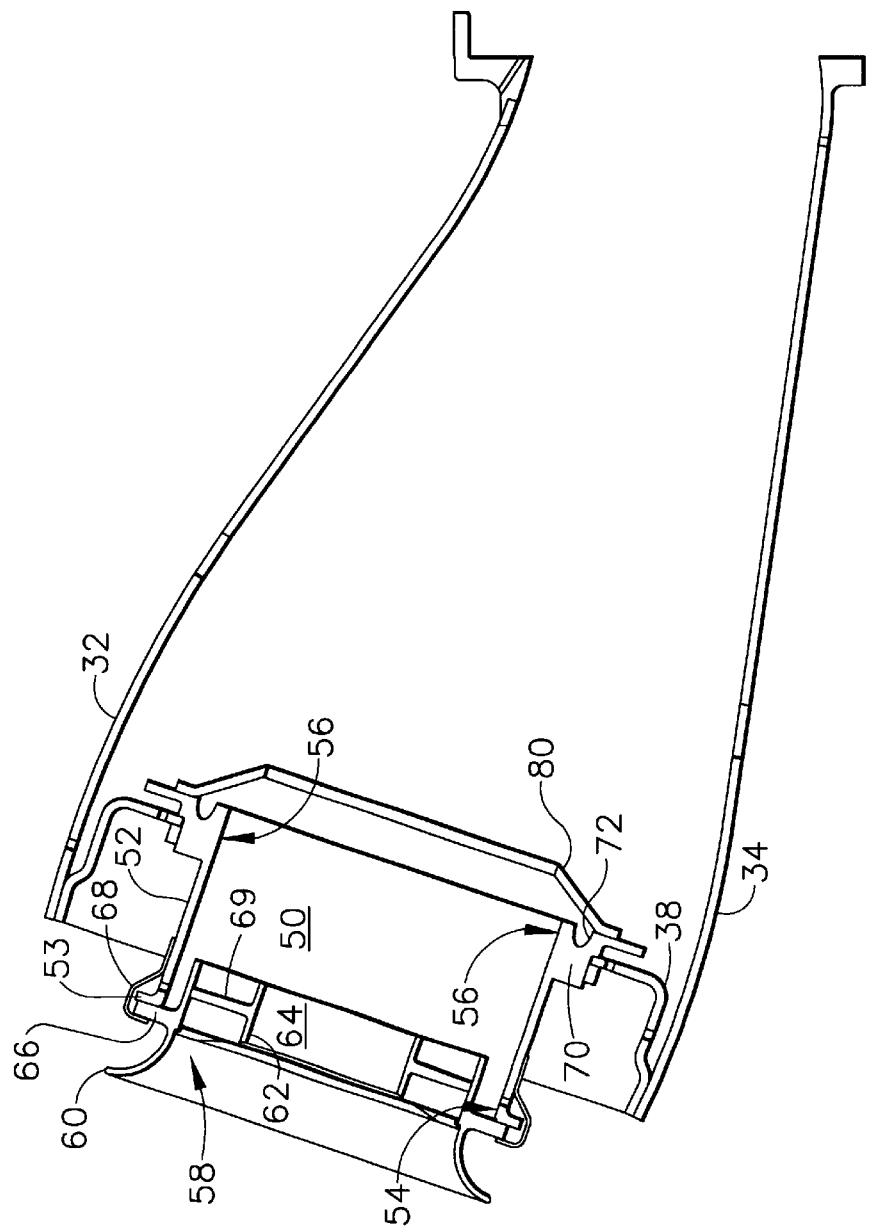
FIG. 3 is a cross-section taken along line 3—3 of FIG. 2.

Referring now to FIG. 3, each of the fuel preparation chambers 50 has a generally cylindrical wall 52 extending axially from an inlet 54 to an exit 56 and defining a fuel preparation chamber 50. The wall 52 does not have to be a perfect cylinder. It can have other diametrical shapes such as elliptical. Also, in the axial direction the wall 52 can be converging or diverging. On its upstream side, the wall 52 has an annular flange 53 extending radially outward. Disposed within the inlet 54 is an air swirler 58. The swirler 58 may be either axial, radial or some combination of the two. The swirler 58 has an outer wall 60 with a curved inlet and an inner wall 62 that defines a hole 64 for receiving the fuel atomizer 20 which may be a single or multiple stage atomizer. The outer wall 60 also has an annular radially extending flange 66. The swirler is mounted to the chamber wall 52 holding the flanges of 53 and 66 together with a retaining clip 68. Disposed between the inner and outer walls 60 and 62 are a plurality of swirler vanes 69.

Circumscribing the exit side 56, the wall 52 has thicker annular portion referred to as a rib 70. A plurality of swirler holes 72 is drilled at a circumferential angle, preferably between 30 to 60 degrees, through the rib 70 so that the air exiting these holes will have the same direction of swirl as the air exiting the swirlers 69. Alternatively, the holes can be disposed so the exiting air swirls in the opposite direction of the air exiting the swirlers 69. In a manner familiar to those skilled in the art, the rib 70 is welded to the dome 38. Welded to the rib 70 on its downstream side is a chimney 80. The chimney 80 is generally conical shaped extending radially inward from the rib 70 at a preferred angle of 35 degrees. It would be appreciated by those skilled in the art that this angle will vary with different combustor designs. Importantly, at the point that the chimney contacts the rib 70, the chimney is radially outward from the holes 72.

Referring back to FIG. 1, fuel entering the preparation chamber is sprayed as represented by arrows 90. A portion of the air represented by arrow 92 enters through swirler 58 concentric with the fuel spray and then mixes with the fuel, creating a swirling mix of air and fuel as represented by lines 94. This swirl is reinforced by the swirled air entering through holes 72. Upon contacting the chimney 80, the swirling mixture is accelerated and flows through the chimney 80 into the combustion chamber 36. Upon leaving the chimney, the mixture rapidly expands and is ignited as represented by arrows 95. This rapid expansion creates a low-pressure zone represented by circle 98, which causes recirculation of the ignited fuel air mixture. This recirculation results in a thorough mixing of the gas, eliminating hot spots and nonuniformities in fuel-to-air ratio thus reducing NOx and CO production. Another advantage to the present invention is that the chimney prevents the flame from propogating into the fuel preparation chamber thus reducing the effects of flashback and auto-ignition.

Various modifications and alterations to the above-described preferred embodiment will be apparent to those skilled in the art. For example, the present invention can be used with combustors other than annular combustors. Accordingly, these descriptions of the invention should be considered exemplary and not as limiting the scope and spirit of the invention as set forth in the following claims.

What is claimed is:

1. An annular flow through combustor comprising:
   an inner and an outer liner spaced apart to define a combustion chamber therebetween, said combustion chamber extending from an upstream end to a downstream end;
   a dome connecting said inner and outer liners at the upstream end of said combustion chamber, said dome having a plurality of circumferentially spaced apart axially facing holes; and
   a fuel preparation chamber disposed in each of said holes, each of said fuel preparation chambers having:
     a wall extending axially from an inlet to an exit;
     an air swirler mounted to said inlet and having an inner wall for receiving a fuel atomizer, said swirler providing swirled air to said fuel preparation chamber and said fuel atomizer delivering fuel to said fuel preparation chamber;
     a rib circumscribing said exit, said rib having a plurality of angled holes extending therethrough for the passage of air and also having an attachment surface, wherein said plurality of angled holes exit at a position radially inward of said attachment surface; and
     a conical chimney sloping radially inward from a first end, attached to said attachment surface adjacent said exit, to a second end disposed in said combustion chamber downstream of said exit, wherein said plurality of angled holes provides additional swirled air to said fuel preparation chamber upstream of said conical chimney and said additional swirled air is rapidly mixed with a fuel-air charge progressing axially from the fuel preparation chamber before said fuel-air charge enters said combustion chamber.

2. The annular combustor of claim 1 wherein said fuel atomizer is a single stage atomizer.

3. The annular combustor of claim 1 wherein said fuel atomizer is a multiple stage atomizer.

4. The annular combustor of claim 1 wherein said holes are angled so that air exiting therefrom is swirling in the same direction as the air exiting said air swirler.

5. The annular combustor of claim 1 wherein said holes are angled so that air exiting therefrom is swirling in the opposite direction as the air exiting said air swirler.

6. An annular combustor comprising:
   an inner and an outer liner spaced apart to define a combustion chamber therebetween, said combustion chamber extending from an upstream end to a downstream end;
   a dome connecting said inner and outer liners at the upstream end of said combustion chamber, said dome having a plurality of circumferentially spaced apart axially facing holes; and
   a fuel preparation chamber disposed in each of said holes, each of said fuel preparation chambers having:
     a wall extending axially from an inlet to an exit;
     a rib circumscribing said exit, said rib having a plurality of holes passing through said rib at a circumferential angle for the passage of air; and
     a conical chimney sloping radially inwardly from a first end adjacent said exit, to a second end disposed in said combustion chamber downstream of said exit, wherein said plurality of holes injects additional swirled air into said fuel preparation chamber upstream of said conical chimney and said additional swirled air is rapidly mixed with a fuel-air charge progressing axially from said fuel preparation chamber before said fuel-air charge enters said combustion chamber.

7. The annular combustor of claim 6 wherein said circumferential angle is between approximately 30 degrees and approximately 60 degrees.

8. The annular combustor of claim 6 further comprising an air swirler mounted to said inlet and having an inner wall for receiving a fuel atomizer, said swirler providing swirled air to said fuel preparation chamber.

9. The annular combustor of claim 8 wherein said holes are angled so that said additional swirled air is swirling in substantially the same direction as the air exiting said air swirler.

10. The annular combustor of claim 8 wherein said holes are angled so that said additional swirled air is swirling in substantially the opposite direction as the air exiting said air swirler.

11. The annular combustor of claim 6 further comprising a fuel atomizer, said fuel atomizer delivering fuel to said fuel preparation chamber.

12. The annular combustor of claim 11 wherein said fuel atomizer is a single stage atomizer.

13. The annular combustor of claim 11 wherein said fuel atomizer is a multiple stage atomizer.

14. An annular combustor comprising:
 an inner and an outer liner spaced apart to define a combustion chamber therebetween, said combustion chamber extending from an upstream end to a downstream end;
 a dome connecting said inner and outer liners at the upstream end of said combustion chamber, said dome having a plurality of circumferentially spaced apart axially facing holes; and
 a fuel preparation chamber disposed in each of said holes, each of said fuel preparation chambers having:
  a wall extending axially from an inlet to an exit;
  a rib circumscribing said exit, said rib having a plurality of holes passing through said rib at a circumferential angle and said rib also having an attachment surface, wherein said plurality of holes exit at a position radially inward of said attachment surface; and
  a conical chimney sloping radially inwardly from a first end attached to said attachment surface adjacent said exit, to a second end disposed in said combustion chamber downstream of said exit.

15. The annular combustor of claim 14 further comprising an air swirler mounted to said inlet and having an inner wall for receiving a fuel atomizer, said swirler providing swirled air to said fuel preparation chamber.

16. The annular combustor of claim 15 wherein said holes are angled so that said additional swirled air is swirling in substantially the same direction as the air exiting said air swirler.

17. The annular combustor of claim 15 wherein said holes are angled so that said additional swirled air is swirling in substantially the opposite direction as the air exiting said air swirler.

18. The annular combustor of claim 17 further comprising a fuel atomizer, said fuel atomizer delivering fuel to said fuel preparation chamber.

* * * * *